INVENTOR.
ERNEST E. WEMP

Patented May 23, 1933

1,910,141

UNITED STATES PATENT OFFICE

ERNEST E. WEMP, OF DETROIT, MICHIGAN

CLUTCH

Application filed October 22, 1930. Serial No. 490,522.

This invention has to do with a clutch adaptable for use in an automotive vehicle. More specifically, the invention is concerned with a clutch in which the so-called free wheeling action is obtained, and by this is meant that while the clutch operates to establish a driving connection so that the engine may propel the vehicle, yet the engine may be decelerated and the vehicle will overrun or coast along.

In carrying out the invention a construction along the general lines of that shown in my application Serial No. 490,521, filed October 22, 1930, may be followed. The construction, in connection with the overrunning clutch, utilizes centrifugally controlled clutch members for establishing the driving connection. The centrifugally controlled clutch may advantageously be termed the primary clutch, for this is the clutch adapted to be used in normal car operation and in conjunction with this, there is a secondary clutch. The present invention is concerned especially with an arrangement wherein there is an assurance that the centrifugal clutch will be brought into play. Just how this is accomplished and the reasons for it will be better appreciated by an understanding of the construction more in detail.

In the accompanying drawings:

Fig. 3 is a detail view of a clutch control pedal pad.

Fig. 4 is a detail in illustration of a construction of a member for carrying clutch facing material.

Figure 1:
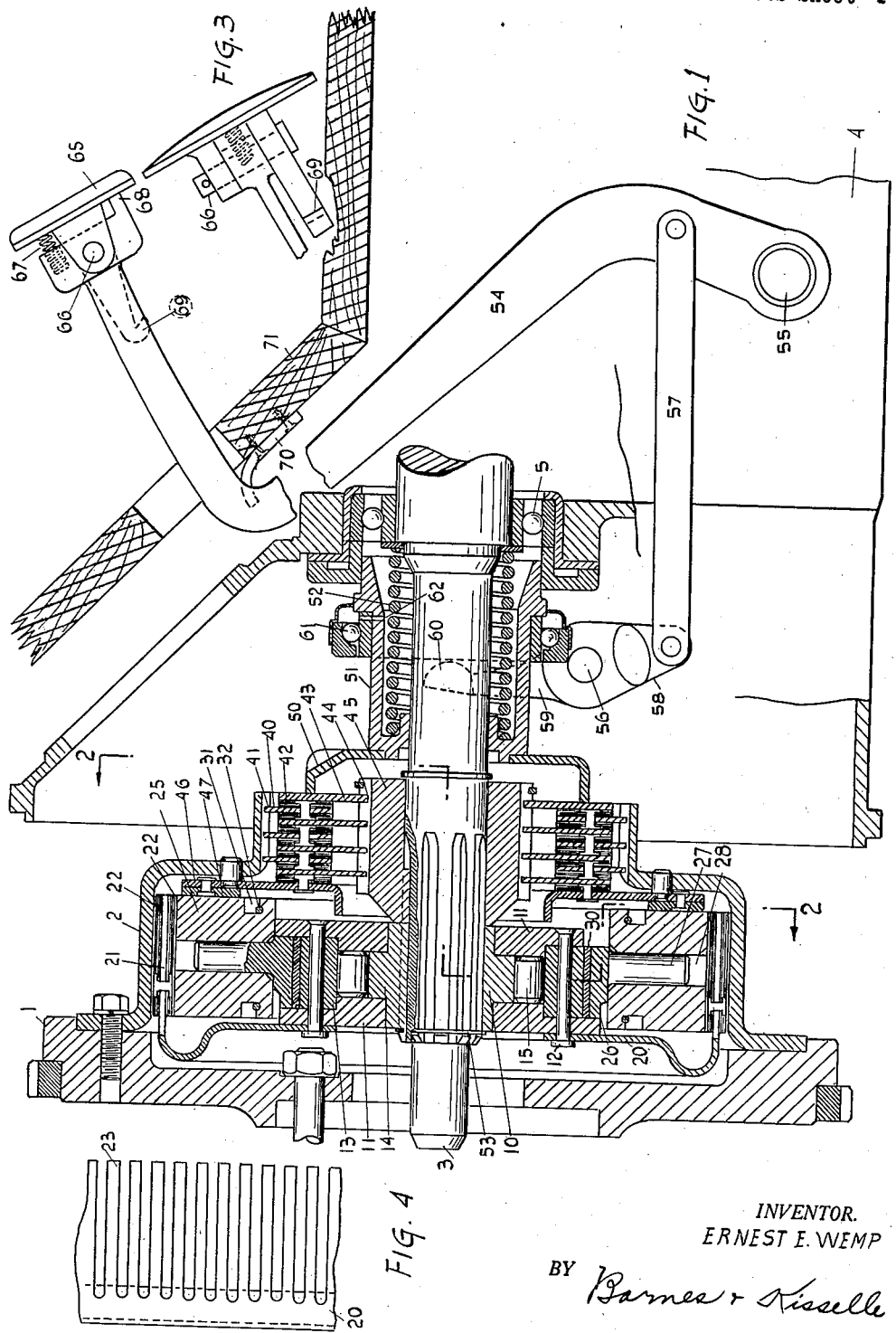
Fig. 1 is a sectional view taken through a clutch constructed in accordance with the invention.

The driving member of the clutch may comprise primarily a fly wheel 1 which may be the fly wheel of an internal combustion engine having bolted or otherwise secured thereto a driving member 2. A driven shaft is illustrated at 3 and this may be the main driven shaft extending into the transmission housing, the same being illustrated at 4, with the shaft journaled as at 5.

Considering first the primary clutch, it will be noted that there is a hub-like part 10 secured to the shaft 3 to rotate therewith as by means of the conventional spline connection, and associated with this hub is a unit assembly which may consist of two similar circular or ring-like members 11, fixed together as by means of rivets 12 with an intervening spacer 13. The hub has a central rib or flange 14, and the members 11 embrace opposite sides thereof in such a manner that the unit is rotatable with respect to the hub. An overrunning clutch is positioned intermediate the unit assembly and hub, which may employ rollers 15 riding on the rib 14 and positioned between the rib and the spacer element 13 which is also of ring form. By reference to Fig. 2 it will be noted that three of such rollers are provided in grooves or notches in the rib 14, as illustrated at 16, each having an inclined wall or face 17. These rollers may be backed up by plungers 18 spring pressed by coil springs 19. This is exemplary of an overrunning connection and it will be appreciated that if the element 13 is caused to rotate counterclockwise, as Fig. 2 is viewed, the rollers 13 are jammed up against the inclined faces 17 effecting rotation of the hub; if there is a tendency for the hub to overrun the element 13 it may do so by reason of the inclined faces 17 moving away from the rollers so that the jamming action ceases.

Referring back to Fig. 1 it will be noted that there is carried by the unit 11 a member 20, which may be held by the rivets 12, having an axially extending rim 21 which carries clutch facing material 22 both inside and out. The rim 21 is preferably flexible for a purpose as will later appear, and to accomplish this the rim may be slotted at a number of places to provide projecting times or the like at 23 (see Fig. 4). The clutch facing material is situated within the member 2 and is arranged to engage the inner peripheral face of this member.

Figure 2:
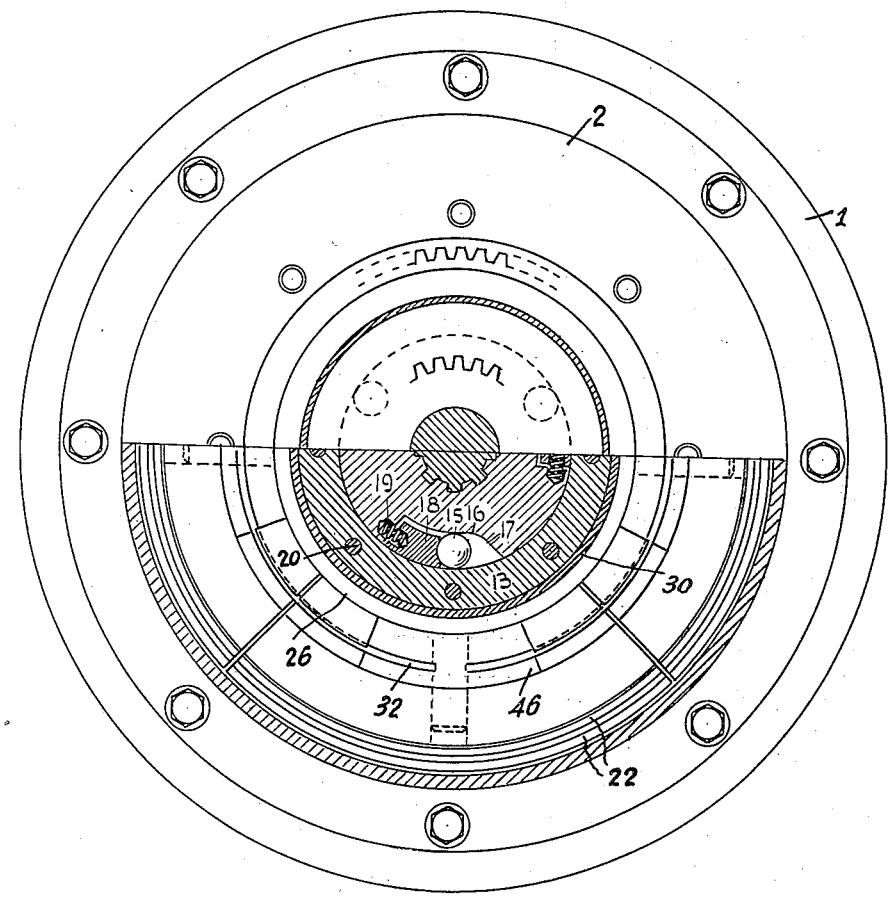
Fig. 2 is a sectional view taken substantially on line 2—2 of Fig. 1.

Elements controlled by centrifugal action, which may take the form of weights 25, are positioned inwardly of the rim 21, and as shown in Fig. 2, there may be four of such weights, although this number may vary. These weights are carried by a ring 26 having radially extending studs 27, and there may be one stud for each weight, and each weight is provided with an opening 28 for the reception of the studs so that the weights may reciprocate thereon. The ring 26 is rotatable relative to the unit comprising the members 11 and spacer element 13, and for facilitating this action a suitable bearing 30 may be located between the spacer element 13 and ring 26. This bearing may be of bronze or other suitable material. The weighted members 25 are normally held radially inward and for this purpose each may be slotted or grooved as at 31 for receiving split rings 32 which normally contract.

The construction thus described constitutes what may be termed a primary clutch. In order that its action may be understood, it will be assumed that the parts are rotating together. At this time, due to the rotation of the driven parts, the weights 25 are thrown outwardly centrifugally; this causes the clutch facing material 22 to be frictionally engaged between the weights and the driving member 2 which is permitted by reason of the rim 21 being relatively flexible, thus driving the member 20. Inasmuch as the member 20 is positively connected to the unit made up of the parts 11 and other associated parts, this unit causes the hub 10 to rotate through the means of the overrunning clutch consisting of the rollers 15 and other associated parts. Thus the engine may drive the vehicle; should the engine be decelerated, the vehicle may continue to move without material deceleration because the driven shaft 3 may overrun the driven parts of the primary clutch, more specifically, the members 11, 20 and 25 and others.

Inasmuch as the centrifugally controlled elements of the primary clutch are mounted upon the driven member they cannot be brought into play when the vehicle is standing still, and to effect this a secondary clutch is provided. This secondary clutch may advantageously and preferably does have a torque capacity materially less than that required for the particular vehicle, such as for example, the torque capacity of the primary clutch. It may consist of a plurality of driving discs 40 having a toothed engagement, as at 41, with the member 2, and these driving discs preferably carrying clutch facing material 42. Driven discs 43 have a toothed engagement, as at 44, with a hub member 45 keyed or otherwise fixed to the driven shaft 3, as by means of the usual spline connection. An auxiliary driving disc 46 having clutch facing material 47 has a greater diameter than the other discs of the secondary clutch, and the clutch facing material 47 is arranged to engage with the centrifugally controlled weights 25. A pressure plate 50 is arranged to pack the discs of the secondary clutch together and it may be mounted upon the sleeve 51 surrounding the driven shaft 3 and acted upon by packing spring 52. The packing spring is backed up by the anti-friction bearing 5, and when it packs the discs together the force is communicated through the several discs including the driving disc 46 to the weights 25, and finally resisted by a ring 53 on the driven shaft 3.

The secondary clutch may be controlled as by means of a foot lever 54 pivoted as at 55, arranged to rock shaft 56 through the means of a connecting link 57 which connects to an arm 58 on the rock shaft. This rock shaft may have spaced or forked members 59 for engaging, as at the point 60, with an anti-friction bearing 61 mounted upon the sleeve 51. It will be noted that if the lever 54 is depressed, rock shaft 56 is moved clockwise, the sleeve 51 shifted from left to right, spring 52 compressed and the packing pressure on the several driving and driven discs of the secondary clutch relieved. The arms 59 may or may not act upon the sleeve 51 through the means of an anti-friction bearing, although this is preferable for reasons later to appear, and the bearing 61 may be lubricated through the means of one or more apertures 62 communicating to the interior of the sleeve 51, which may in turn communicate into the transmission housing 4.

Means are provided for holding the secondary clutch released, and this may take the form of a pedal pad 65 pivotally mounted to the lever 54, as at 66, and normally held by a spring 67 against a stop 68. A projection on this pad may be in the form of a hook 69 which normally lies within the boundary lines of the lever 54 when the pad is in its normal position as shown in Fig. 1. A suitable catch such as a plate 70 mounted, as by means of screws, on floor boards or the like 71, is arranged to be engaged by the hook 69. The lever may be depressed, and then the operator by rocking the pad 65 on its mounting 66 may cause the hook 69 to engage the catch 70 thus to hold the lever depressed with the spring 52 compressed, pressure plate 50 retracted, and the packing pressure released, as between the discs of the secondary clutch. The secondary clutch may have multiple discs as shown, although a single disc clutch may suffice, but where these discs are relatively small with the clutching face located near the axis of the driven shaft 3 the multiple disc type is thought to be preferred.

As heretofore pointed out, the secondary clutch may be engaged to impart initial vehicle movement. When the secondary clutch is engaged, the driven shaft is positively driven and the centrifugal weights are rotated, and when the R. P. M. is sufficiently high the weights 25 are centrifugally thrown outwardly and the primary clutch engaged. The secondary clutch, however, is preferred to have less torque capacity than is normally required, and it is possible that when the vehicle is in mud, one or more depressions, or a ditch, or the like, or on a steep incline that the secondary clutch will not have the torque capacity sufficient to impart initial movement to the vehicle. In other words, it would slip and no movement of the driven shaft would result, and accordingly the vehicle would be stalled. However, the present arrangement provides for avoiding this circumstance. Should the vehicle be stalled in such manner that the secondary clutch is not strong enough to get it under way, the clutch facing 46 would nevertheless take hold of the weights 25 and cause them to rotate. This they are free to do by rotating upon the bearing 30, and the only parts rotating at this time would be the weights 25 and their supporting ring 26. When the R. P. M. has risen sufficiently the weights will be thrown outwardly by centrifugal action and the primary clutch brought into play by the engagement of the clutch facing material 22, and the primary clutch having the full required torque capacity is sufficient to get the vehicle under way.

In normal operation, the secondary clutch may be used to impart initial vehicle movement and then be locked out by engaging the hook 69 behind the catch 70. It is contemplated that the primary clutch will come into play at a relatively low vehicle speed, as for example, the movement of a few miles per hour. An automotive vehicle may be operated identical with the manner of the present day manner if the operator chooses not to lock out the secondary clutch. On the other hand, it may be operated as follows: shift into low, engage the secondary clutch to impart initial vehicle movement; if the vehicle movement is sufficient the secondary clutch may now be locked out and then the gear shift from second into high may be accomplished. On the other hand, after starting in low the operator may disengage the secondary clutch, shift into second, and reengage the secondary clutch to impart more vehicle speed and then may lock out the secondary clutch. Due to the fact that the driven parts are free to override or overrun, gear shifting is possible without clutch operation when the primary clutch alone is used. This is especially true where the inertia of the driven parts is low, as in the present case where the hub member 10 and member 45 and driven discs 43 are located relatively close to the axial center of the shaft.

The secondary clutch may be used at other times, as for example when it becomes necessary to push or tow the vehicle to get the engine started. In the event that the secondary clutch is not strong enough for this the weights 25 are picked up by the clutch driving member 46 which results in engagement of the primary clutch. It is contemplated that in a construction of this kind the vehicle will be operated much of the time with the secondary clutch disengaged, and it is for this purpose that the spring 52 when compressed is held by the anti-friction bearings 5 and 61.

I claim:

1. A clutch comprising in combination, a driving member, a driven member, centrifugally controlled clutch elements carried by the driven member, means carried by the driven member adapted to be engaged by the driving member upon action of the centrifugally controlled elements, and clutch means for imparting rotation directly to the centrifugally controlled elements from the driving member.

2. A clutch comprising in combination a driving member, a driven shaft, means carried by the driven shaft for engagement with the driving member, centrifugally controlled elements rotatably mounted upon the driven shaft, and means for imparting rotation to the centrifugally controlled elements from the driving member to cause the means carried by the driven shaft to be engaged by the driving member.

3. A clutch comprising in combination a driving member, a driven shaft, means carried by the driven shaft arranged to frictionally engage the driving member but normally spaced therefrom, centrifugally controlled elements, and means for effecting frictional engagement between the driving member and the centrifugally controlled elements, said elements being adapted when moved by centrifugal action to cause frictional engagement between the driving member and the said first named means carried by the driven shaft.

4. A clutch comprising in combination a driving member, a driven shaft, means carried by the driven shaft arranged to frictionally engage the driving member but normally spaced therefrom, centrifugally controlled elements carried by the driven member and rotatable with respect thereto, and means for effecting frictional engagement between the driving member and the centrifugally controlled elements, said elements being adapted when moved by centrifugal action to cause frictional engagement between the driving member and the said first named means carried by the driven shaft.

5. A clutch comprising in combination a driving member, a driven shaft, a driven member supported by the driven shaft and rotatable with respect thereto, centrifugally controlled elements on the driven member associated with respect to the driving member whereby movement of the centrifugally controlled elements causes frictional engagement between the driving member and said driven member.

6. A clutch comprising in combination a driving member, a driven shaft, a primary clutch, centrifugal means supported by the driven shaft for effecting engagement of the primary clutch, a secondary clutch for establishing a driving engagement between the driving member and driven shaft, and means for imparting rotation to the centrifugally controlled elements independently of the rotation of the driven shaft.

7. A clutch comprising in combination a driving member, a driven shaft, a primary clutch, centrifugal means supported by the driven shaft for effecting engagement of the primary clutch, a secondary clutch for establishing a driving engagement between the driving member and driven shaft, and means for imparting rotation to the centrifugally controlled elements independently of the rotation of the driven shaft, said last named means comprising a clutch disc associated with the secondary clutch for frictionally engaging the centrifugally controlled elements.

8. A clutch comprising a driving member, a driven shaft, a driven member, an overrunning clutch between the driven member and driven shaft, centrifugally controlled clutch elements adapted to effect frictional engagement between the driving member and driven member, and means controllable at will for imparting rotation from the driving member to the centrifugally controlled elements.

9. A clutch comprising a driving member, a driven shaft, a driven member, an overrunning clutch beween the driven member and driven shaft, centrifugally controlled clutch elements adapted to effect frictional engagement between the driving member and driven member, said centrifugally controlled clutch elements being rotatably mounted upon said driven member.

10. A clutch comprising a driving member, a driven shaft, a driven member, an overrunning clutch between the driven member and driven shaft, centrifugally controlled clutch elements adapted to effect frictional engagement between the driving member and driven member, said centrifugally controlled clutch elements being rotatably mounted upon said driven member, and means for effecting rotation of the centrifugally controlled elements.

11. A clutch comprising a driving member, a driven shaft, a driven member, an overrunning clutch between the driven member and driven shaft, centrifugally controlled clutch elements adapted to effect frictional engagement between the driving member and driven member, said centrifugally controlled clutch elements being rotatably mounted upon said driven member, and means carried by the driving member arranged to frictionally engage the centrifugally controlled elements to impart rotation thereto.

12. A clutch comprising a driving member, a driven shaft, a driven member, an overrunning clutch between the driven member and driven shaft, centrifugally controlled clutch elements adapted to effect frictional engagement between the driving member and driven member, said centrifugally controlled clutch elements being rotatably mounted upon said driven member, means carried by the driving member arranged to frictionally engage the centrifugally controlled elements to impart rotation thereto, and means for disengaging the frictional engagement between the driving member and centrifugally controlled elements.

13. A clutch comprising in combination a driving member, a driven shaft, a primary clutch comprising a driven member carried by the driven shaft arranged to frictionally engage the driving member, centrifugally controlled elements for effecting such engagement, a secondary clutch for effecting a drive connection between the driving member and driven shaft at will, and means associated with the secondary clutch for effecting rotation of the centrifugally controlled elements directly from the driving member to said elements.

14. A clutch comprising in combination a driving member, a driven shaft, a primary clutch comprising a driven member carried by the driven shaft arranged to frictionally engage the driving member, centrifugally controlled elements for effecting such engagement, means rotatably mounting the centrifugally controlled elements with respect to the driven shaft, a secondary clutch for effecting drive connection between the driving member and driven shaft at will, and means associated with the secondary clutch for effecting rotation of the centrifugally controlled elements from the driving member.

15. A clutch construction comprising in combination, driving and driven members, a primary clutch for establishing a connection between them, centrifugally controlled means rotatable as regards both the driving and driven members for effecting engagement of the primary clutch, a secondary clutch for effecting engagement between the driving and driven members, and means for effecting rotation of the centrifugally controlled elements from the driving member whereby primary clutch engagement may be effected in the event of slippage of the secondary clutch.

16. A clutch comprising in combination, a driving member, a driven shaft, a driven member, an overrunning clutch between the driven member and driven shaft, means carried by the driven member for frictionally engaging the driving member, centrifugally controlled elements rotatable as regards both driving and driven members for effecting engagement of the driving and driven members as a primary clutch, a secondary clutch for effecting engagement between the driving member and the centrifugally controlled elements whereby the driving member may impart rotation to the centrifugally controlled elements, and means for disengaging the secondary clutch.

17. A clutch comprising in combination, a driving member, a driven shaft, a driven member, an overrunning clutch between the driven member and driven shaft, means carried by the driven member for frictionally engaging the driving member, centrifugally controlled elements rotatable as regards both driving and driven members for effecting engagement of the driving and driven members as a primary clutch, a secondary clutch for effecting engagement between the driving member and the centrifugally controlled elements whereby the driving member may impart rotation to the centrifugally controlled elements, and means for disengaging and for holding disengaged said secondary clutch.

18. A clutch comprising in combination, a driving member, a driven shaft, a driven member, an overrunning clutch between the driven member and driven shaft, means carried by the driven member for frictionally engaging the driving member, centrifugally controlled elements rotatable as regards both driving and driven members for effecting engagement of the driving and driven members as a primary clutch, a secondary clutch for establishing driving connection between the driving member and driven shaft independent of the overrunning clutch, said secondary clutch having a part arranged to establish a connection between the driving member and centrifugally controlled elements.

19. A clutch comprising in combination, a driving member, a driven shaft, a driven member, an overruning clutch between the driven member and driven shaft, means carried by the driven member for frictionally engaging the driving member, centrifugally controlled elements rotatable as regards both driving and driven members for effecting engagement of the driving and driven members as a primary clutch, a secondary clutch for establishing driving connection between the driving member and driven shaft independent of the overrunning clutch, said secondary clutch having a part arranged to establish a connection between the driving member and centrifugally controlled elements, and means for locking the secondary clutch out of engagement.

20. A clutch comprising in combination a driving member having an interior circumferential friction surface, a driven shaft, a driven member having a part with a flange substantially paralleling said surface of the driving member, an overruning clutch between the driven member and shaft, means rotatably mounted upon the driven member carrying centrifugally controlled elements, said elements being located within the flange, and means for effecting a clutch engagement between the driving member and the means carrying centrifugally controlled elements whereby to impart rotation thereto with the resultant centrifugal action causing flexure of the flange, with said flange frictionally engaged between said surface of the driving member and said elements.

21. A clutch comprising in combination a driving member having an interior circumferential friction surface, a driven shaft, a driven member having a part with a flange substantially paralleling said surface of the driving member, an overruning clutch between the driven member and shaft, means rotatably mounted upon the driven member carrying centrifugally controlled elements, said elements being located within the flange, and means for effecting a clutch engagement between the driving member and the means carrying the centrifugally controlled elements whereby to impart rotation thereto with the resultant centrifugal action causing flexure of the flange with said flange frictionally engaged between said surface of the driving member and said elements, and other frictionally engaging elements associated, respectively, with the shaft and driving member for establishing a drive connection independently of said driven member.

In testimony whereof I affix my signature.

ERNEST E. WEMP.